US012656102B2

(12) United States Patent
Rahman et al.

(10) Patent No.: US 12,656,102 B2
(45) Date of Patent: Jun. 16, 2026

(54) SYSTEM AND METHOD FOR GEOMETRIC TRANSFORMATION OF A DIMENSIONAL INSPECTION

(71) Applicant: PRATT & WHITNEY CANADA CORP., Longueuil (CA)

(72) Inventors: Md Mizanur Rahman, Saint-Hubert (CA); Pengyou Wei, Kirkland (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 236 days.

(21) Appl. No.: 18/653,113

(22) Filed: May 2, 2024

(65) Prior Publication Data

US 2025/0341390 A1    Nov. 6, 2025

(51) Int. Cl.
| | |
|---|---|
| *G01N 21/55* | (2014.01) |
| *G01B 11/00* | (2006.01) |
| *G01B 11/24* | (2006.01) |
| *G01N 21/57* | (2006.01) |

(52) U.S. Cl.
CPC ............ *G01B 11/005* (2013.01); *G01B 11/24* (2013.01); *G01N 21/55* (2013.01); *G01N 21/57* (2013.01)

(58) Field of Classification Search
CPC ...... G01B 11/005; G01B 11/24; G01B 5/008; G01N 21/55; G01N 21/57; G06T 2207/10028; G06T 7/521
See application file for complete search history.

(56) References Cited

U.S. PATENT DOCUMENTS

| | | | |
|---|---|---|---|
| 7,508,971 B2 | 3/2009 | Vaccaro et al. | |
| 9,417,624 B2 | 8/2016 | Bellerose et al. | |
| 11,159,784 B2 * | 10/2021 | Filhaber ................ | H04N 23/90 |
| 11,334,051 B2 | 5/2022 | Auxier et al. | |
| 11,619,482 B1 | 4/2023 | Lillya | |
| 11,720,076 B2 | 8/2023 | Borowicz | |
| 11,802,760 B2 | 10/2023 | Kocic | |
| 2013/0232803 A1 | 9/2013 | Romanelli | |

(Continued)

FOREIGN PATENT DOCUMENTS

| | | |
|---|---|---|
| CN | 115655140 A | 1/2023 |

OTHER PUBLICATIONS

European Patent Office, Communication re. extended European search report for European patent application No. 25174060.1, Oct. 9, 2025.

(Continued)

*Primary Examiner* — Rebecca C Bryant
(74) *Attorney, Agent, or Firm* — Norton Rose Fulbright Canada LLP

(57) ABSTRACT
Systems and methods for performing dimensional inspection of components are provided. The systems and methods correct errors associated with non-contact scanning of components based on surface quality. A method of inspecting a component includes using non-contact scanning of the component to acquire a point cloud indicative of a geometry of the component, acquiring a surface quality of the component, and selecting a geometric transformation associated with the surface quality of the component from a plurality of geometric transformations respectively associated with different surface qualities. The point cloud is transformed using a selected geometric transformation associated with the surface quality of the component.

20 Claims, 13 Drawing Sheets

(56) References Cited

U.S. PATENT DOCUMENTS

| | | | |
|---|---|---|---|
| 2021/0109453 A1* | 4/2021 | Pandev | ............. G01B 11/0625 |
| 2021/0158600 A1 | 5/2021 | Bosneaga | |
| 2023/0304476 A1 | 9/2023 | Propheter-Hinckley et al. | |

OTHER PUBLICATIONS

Brian Amberg et al., Optimal Step Nonrigid ICP Algorithms for Surface Registration, Conference Paper in Proceedings / CVPR, IEEE Computer Society Conference on Computer Vision and Pattern Recognition, https://www.researchgate.net/publication/200172513, Jun. 2007, Basel, Switzerland.
Byk, The reference gloss meter, httpszllwww.byk-instruments.com/en/Appearance/haze-gloss-Gloss-Meter/The-reference-gloss-meter/c/p-32774?variant=4601, accessed on April 15, 2024.

\* cited by examiner

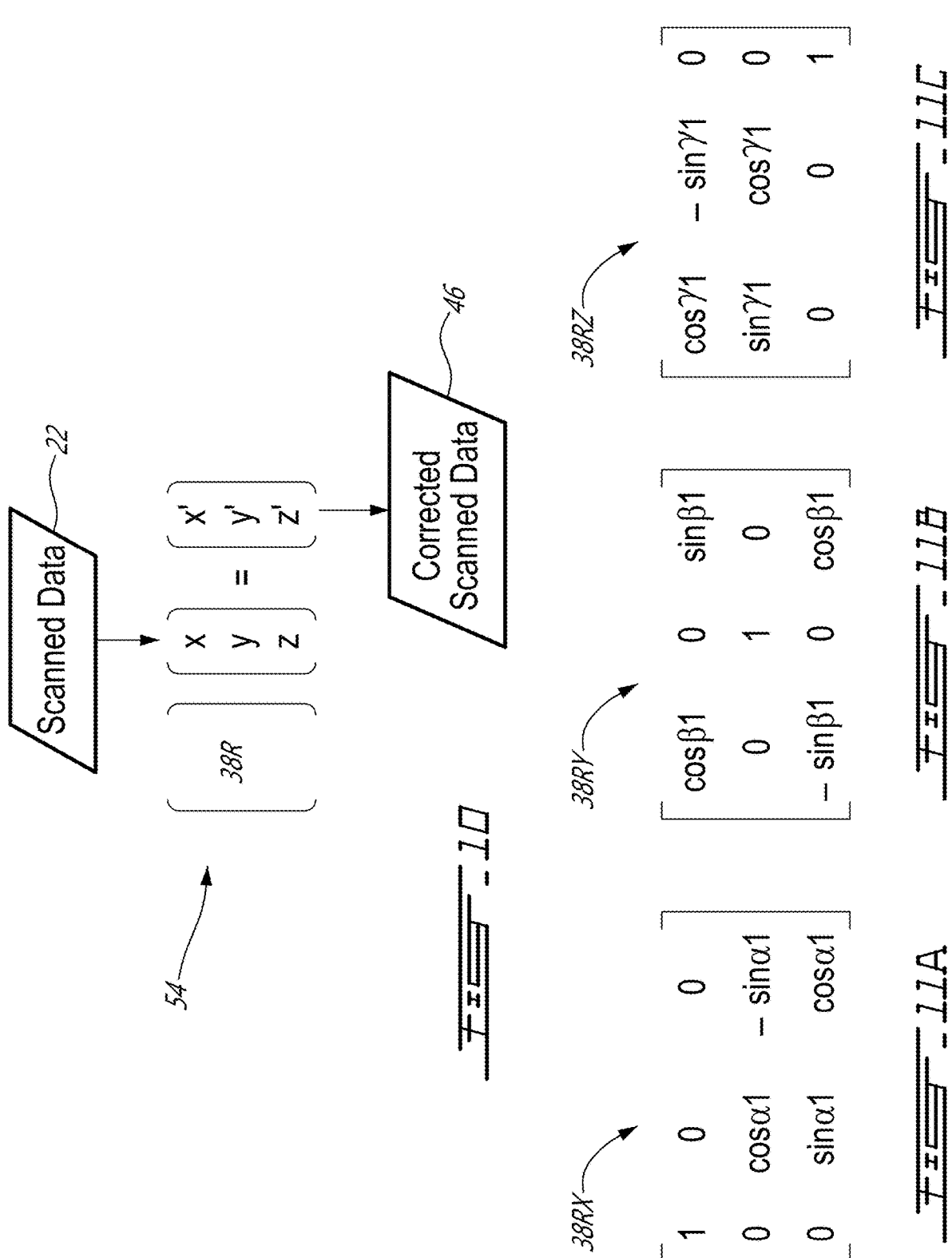

| Part Family | Surface Quality (Gloss Unit) | Transformation(s) 38 |
|---|---|---|
| F1 | GU1 | 38T1, 38R1 |
| F1 | GU2 | 38T2, 38R2 |
| F1 | GU3 | 38T3, 38R3 |
| ⋮ | ⋮ | ⋮ |
| F2 | GU1 | 38T4, 38R4 |
| F2 | GU2 | 38T5, 38R5 |
| ⋮ | ⋮ | ⋮ |

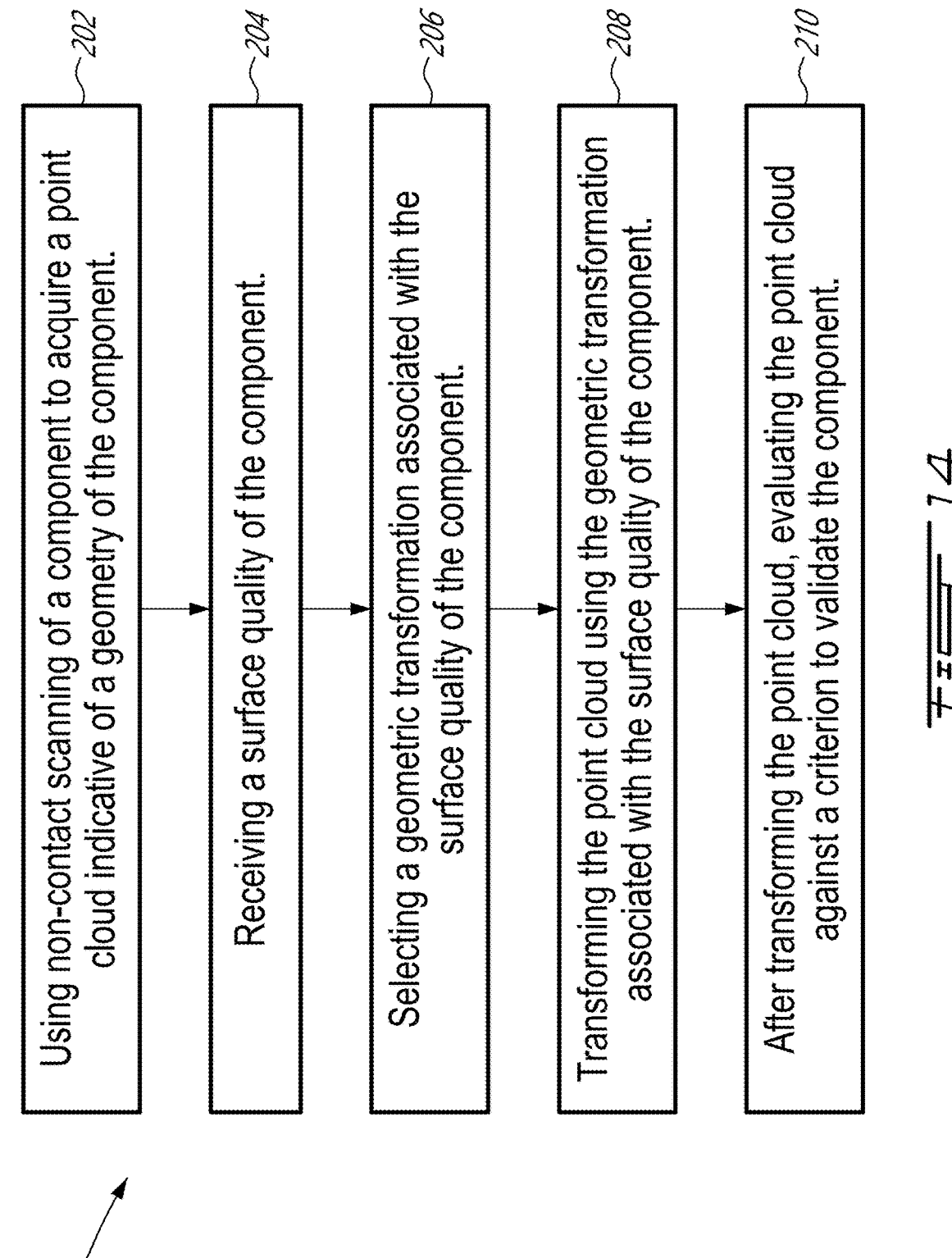

202 — Using non-contact scanning of a component to acquire a point cloud indicative of a geometry of the component.

204 — Receiving a surface quality of the component.

206 — Selecting a geometric transformation associated with the surface quality of the component.

208 — Transforming the point cloud using the geometric transformation associated with the surface quality of the component.

210 — After transforming the point cloud, evaluating the point cloud against a criterion to validate the component.

SYSTEM AND METHOD FOR GEOMETRIC TRANSFORMATION OF A DIMENSIONAL INSPECTION

TECHNICAL FIELD

The disclosure relates generally to metrology, and more particularly to dimensional inspection of components using non-contact three-dimensional (3D) scanning.

BACKGROUND

Dimensional inspection of aircraft engine components typically requires a relatively high degree of accuracy. Traditional dimensional inspection methods used on aircraft engine components can be time consuming and costly. Improvement is desirable.

SUMMARY

In one aspect, the disclosure describes a method of performing a dimensional inspection. The method comprises:

scanning a first component using optical scanning to acquire first scanned data indicative of a geometry of the first component;

measuring the first component using a coordinate measuring machine (CMM) to acquire CMM data indicative of the geometry of the first component;

determining a geometric transformation required to register the first scanned data with the CMM data;

acquiring a surface quality of the first component;

associating the geometric transformation with the surface quality of the first component;

scanning a second component using the optical scanning to acquire second scanned data indicative of a geometry of the second component;

receiving a surface quality of the second component; and when the surface quality of the second component corresponds to the surface quality of the first component, transforming the second scanned data using the geometric transformation associated with the surface quality of the first component.

The surface quality of the first component may include a reflectivity index of a surface of the first component.

Acquiring the surface quality of the first component may include taking a gloss measurement from a surface of the first component.

Determining the geometric transformation required to register the first scanned data with the CMM data may include using a non-rigid registration to align the first scanned data with the CMM data.

The method may comprise constructing a data repository including a plurality of geometric transformations associated with different respective surface qualities of a plurality of first components by, for each first component in the plurality of first components:

scanning the first component using optical scanning to acquire the first scanned data indicative of the geometry of the first component;

measuring the first component using the CMM to acquire the CMM data indicative of the geometry of the first component;

determining the geometric transformation required to register the first scanned data with the CMM data;

acquiring the surface quality of the first component;

associating the geometric transformation with the surface quality of the first component; and storing the geometric transformation and the surface quality in the data repository.

The method may comprise, after receiving the surface quality of the second component, retrieving the geometric transformation from the data repository, the geometric transformation being associated with the surface quality of the second component.

Scanning the first component using optical scanning may include scanning a first region and a second region of the first component. Measuring the first component using the CMM may include measuring the first region and the second region of the first component. The geometric transformation may be a first geometric transformation required to register a first portion of the first scanned data associated with the first region, with the CMM data. The method may include determining a second geometric transformation required to register a second portion of the first scanned data associated with the second region, with the CMM data. The second component may have a first region and a second region respectively corresponding to the first region and the second region of the first component. Transforming the second scanned data may include: transforming a first portion of the second scanned data associated with the first region of the second component using the first geometric transformation; and transforming a second portion of the second scanned data associated with the second region of the second component using the second geometric transformation.

The method may comprise: after transforming the second scanned data, evaluating the second scanned data against a criterion; and when the second scanned data satisfies the criterion, installing the second component in an aircraft engine and/or operating the aircraft engine with the second component.

The geometric transformation may include a translation and a rotation.

Embodiments may include combinations of the above features.

In another aspect, the disclosure describes a method of validating a component of an aircraft engine. The method comprises:

using non-contact scanning of the component to acquire a point cloud indicative of a geometry of the component;

receiving a surface quality of the component;

selecting a geometric transformation associated with the surface quality of the component from a plurality of geometric transformations respectively associated with different surface qualities;

transforming the point cloud using the geometric transformation associated with the surface quality of the component; and after transforming the point cloud, evaluating the point cloud against a criterion to validate the component.

The criterion may include the point cloud complying with a prescribed allowable deviation from a nominal geometry of the component.

The method may comprise, when the component is validated, operating the aircraft engine with the component.

The method may comprise, when the component is validated, installing the component in the aircraft engine.

The surface quality of the component may include a reflectivity index of a surface of the component.

Embodiments may include combinations of the above features.

In another aspect, the disclosure describes a system for performing dimensional inspection of a component. The system comprises:

a non-contact scanner operable to acquire a point cloud indicative of a geometry of the component in a non-contact manner;

one or more data processors; and non-transitory machine-readable memory operatively connected to the one or more data processors and storing:

a plurality of geometric transformations respectively associated with different surface qualities; and instructions executable by the one or more data processors and configured to cause the one or more data processors to:

access a selected geometric transformation from the plurality of geometric transformations, the selected geometric transformation being associated with a surface quality of the component; and transform the point cloud using the selected geometric transformation associated with the surface quality of the component.

The instructions may be configured to cause the one or more data processors to, after transforming the point cloud, evaluate the point cloud against a criterion.

The non-contact scanner may be an optical scanner.

The system may include a gloss meter operable to acquire the surface quality of the component.

The system may comprise a coordinate measuring machine (CMM) operable to acquire CMM data indicative of the geometry of the component.

The selected geometric transformation may be indicative of a registration of the point cloud with the CMM data.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

4

Figure 7:
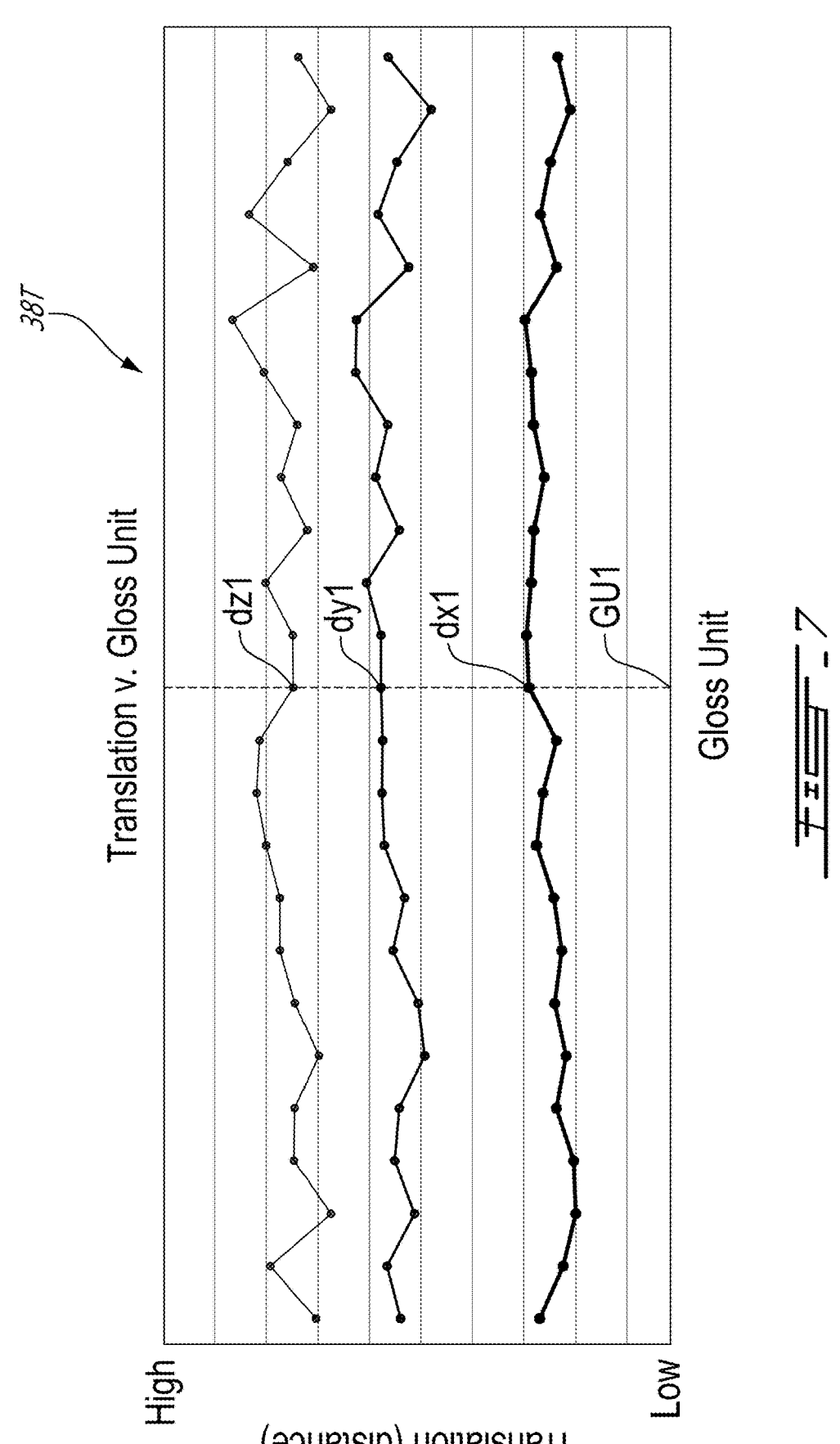
FIG. 7 shows a graph of translation values in the X, Y and Z directions associated with discrete values of gloss unit of a surface of the component.
Figure 8:
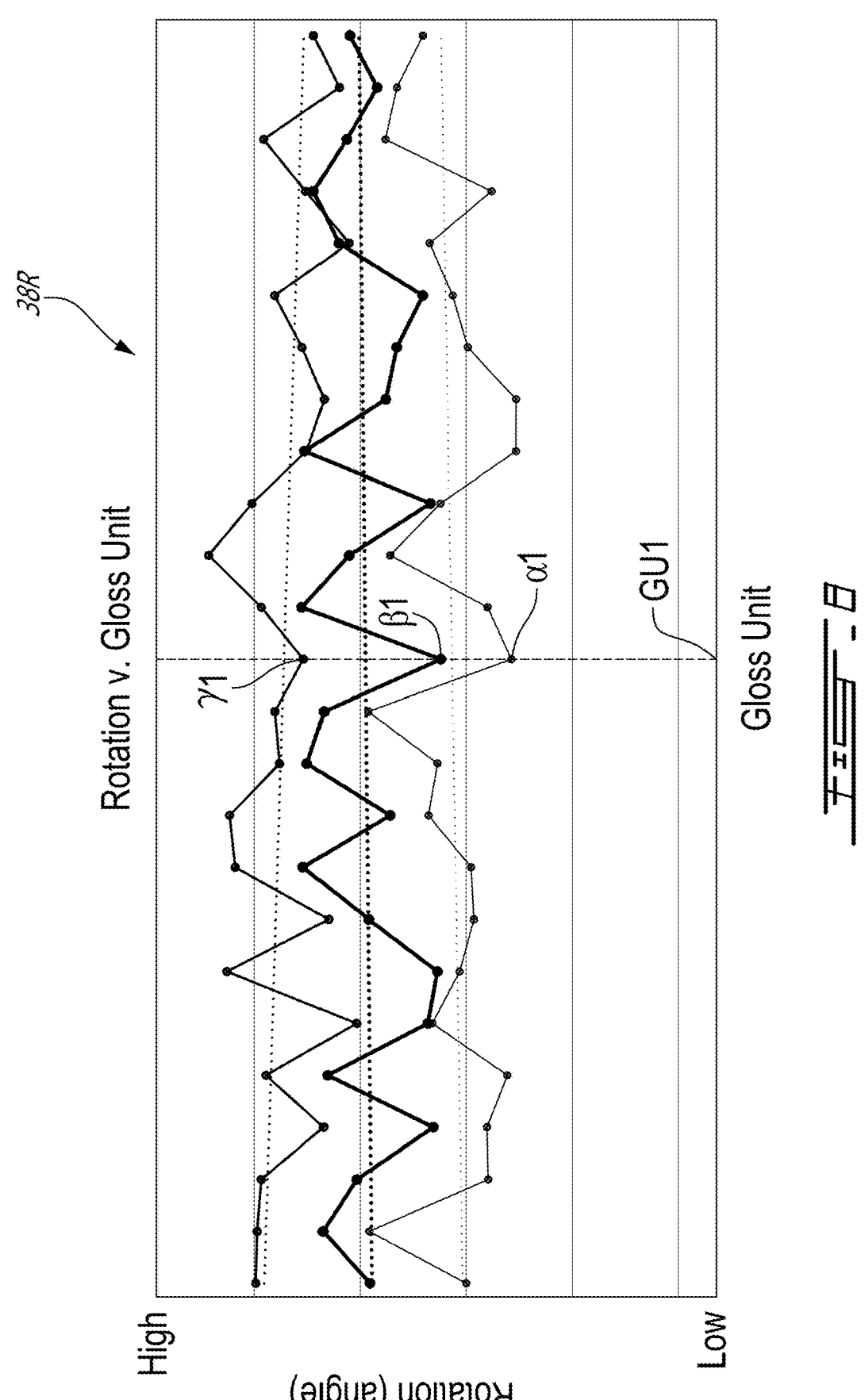
FIG. 8 shows a graph of rotation values about the X, Y and Z axes associated with discrete values of gloss unit of the surface of the component.
Figure 9:
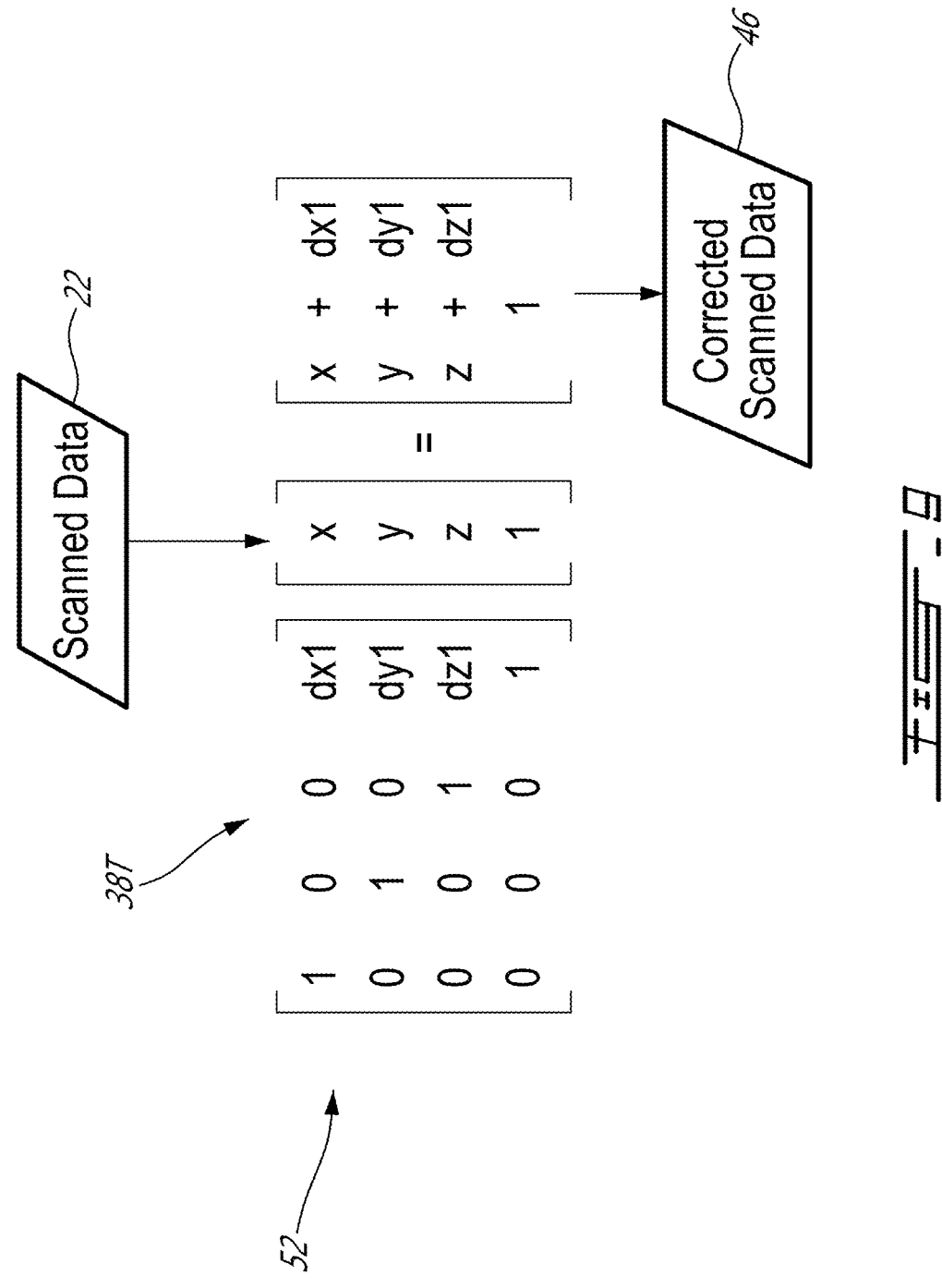
Figure 12:
Figure 13:
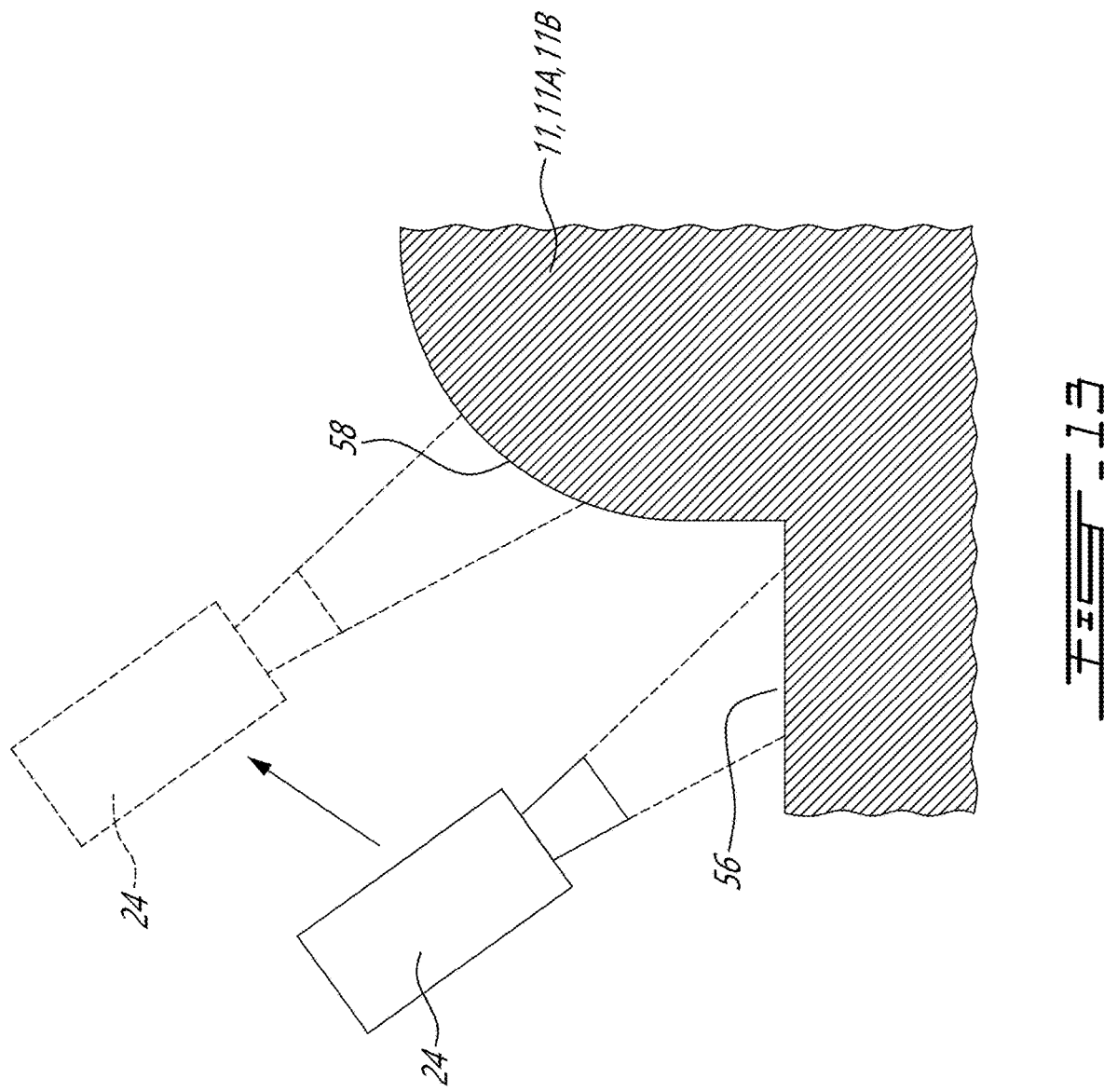

FIG. 9 shows an equation for performing a translation of a point cloud using translation values from the graph of FIG. 7;

FIG. 10 shows an equation for performing a rotation of a point cloud using rotation values from the graph of FIG. 8;

FIGS. 11A-11C show matrices for performing rotation of the point cloud about the X, Y and Z axes respectively;

FIG. 12 shows a data repository storing a plurality of geometric transformations respectively associated with different surface qualities;

FIG. 13 shows another exemplary component having different regions together with a non-contact scanner; and FIG. 14 shows a flow diagram of an exemplary method of validating a component using dimensional inspection.

DETAILED DESCRIPTION

The present disclosure describes systems and methods for performing dimensional inspection of aircraft engine components and other types of components requiring relatively high accuracy (i.e., low measurement uncertainty). In some embodiments, the systems and methods described herein may reduce inspection times by using non-contact scanning together with a correction mechanism that is based on coordinate measuring machine (CMM) measurements and the surface quality of the component. The correction mechanism may be applied to scanned data acquired using the non-contact scanning to improve the accuracy of the scanned data. The correction mechanism may be established during a benchmarking phase by calibrating (i.e. correcting) the scanned data using more accurate contact measurements acquired using the CMM for example. Once the correction mechanism has been established for a type or family of components during the benchmarking phase, the applicable correction mechanism may be applied to scanned data acquired during a high-volume validation/production phase based on the surface quality of the component and without the need of the CMM. In various embodiments, the accuracy of the scanned data may be improved while the need for the time consuming acquisition of contact measurements using the CMM may be reduced or eliminated during the production/validation phase of the component or family of components.

Aspects of various embodiments are described through reference to the drawings.

The term "connected" may include both direct connection (in which two elements contact each other) and indirect connection (in which at least one additional element is located between the two elements). The term "substantially" as used herein may be applied to modify any quantitative representation which could permissibly vary without resulting in a change in the basic function to which it is related. As used herein, the singular forms "a," "an," and "the" are intended to include the plural forms as well, unless the context clearly indicates otherwise.

Figure 1:
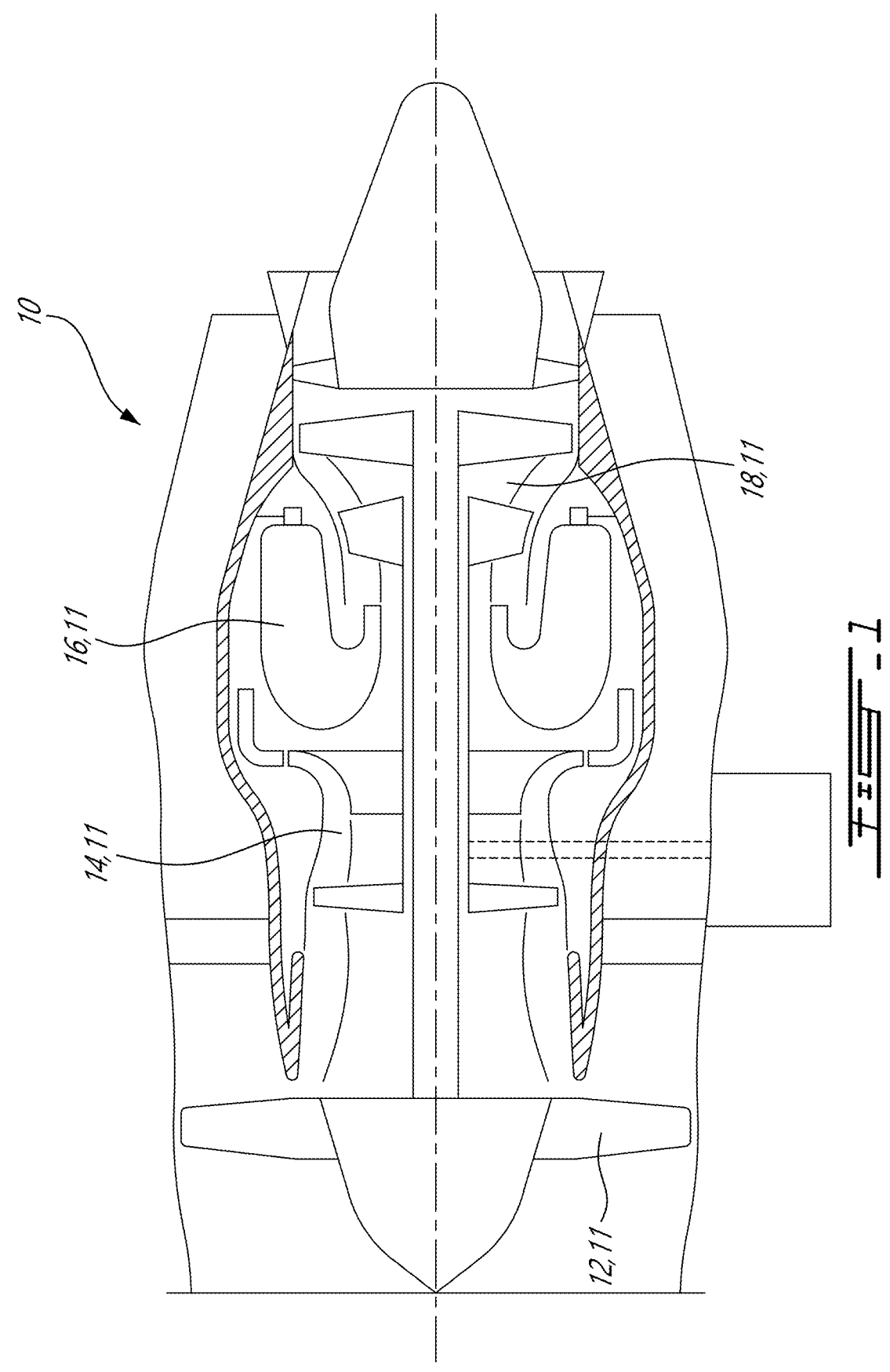
FIG. 1 shows an axial cross-section view of an exemplary aircraft engine including one or more components that may be used with the systems and methods described herein.

FIG. 1 illustrates an exemplary aircraft engine 10 including one or more components 11 that may be used with the methods and systems described herein. In some embodiments, engine 10 may be a turbo-fan gas turbine engine but it is understood that the systems and methods described herein may be used to perform dimensional inspections of components from other types of engines and/or from other applications. Engine 10 may be of a type preferably provided for use in subsonic flight, generally comprising in serial flow communication, fan 12 through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases.

Figure 2:
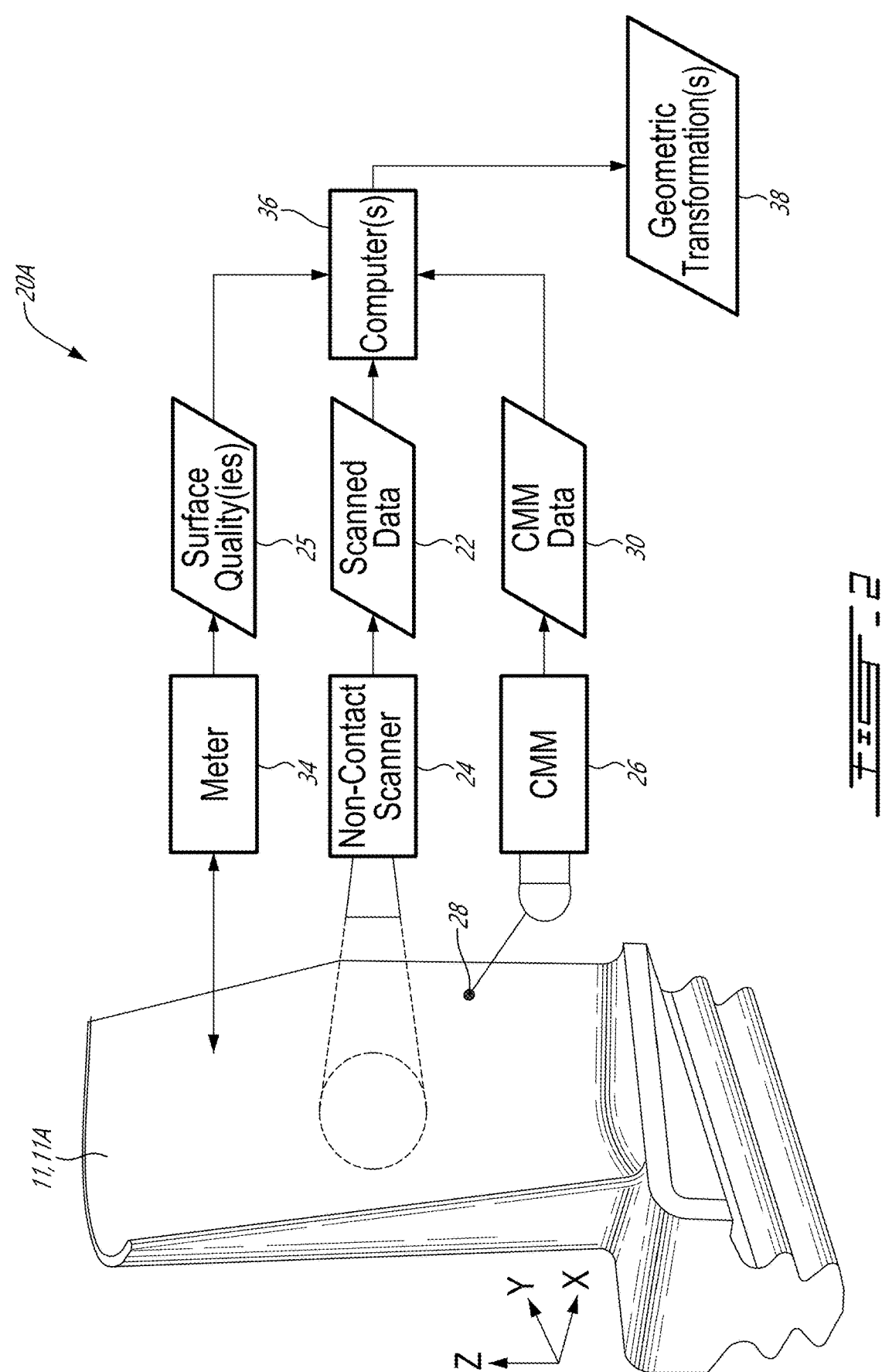
FIG. 2 shows an exemplary component of the engine of FIG. 1 together with a schematic representation of an exemplary system for performing dimensional inspection of the component during a benchmarking phase.

FIG. 2 shows exemplary component 11 of engine 10 together with a schematic representation of an exemplary system 20A for performing dimensional inspection of component 11 during a benchmarking phase. The benchmarking phase may serve to develop a standard correction mechanism that may be applied to scanned data 22 that is acquired (i.e., sensed) using non-contact (e.g., optical) scanner 24. Non-contact scanning (also referred to as "3D scanning") may offer relatively fast, high-quality and high-density data but the accuracy of the scanned data (e.g., point cloud) may be affected by the surface quality 25 (e.g., reflectivity) of component 11.

The correction mechanism may be established using one or more measurements acquired using another measurement technique having a different principle of operation than the non-contact scanning, and considered more accurate than the non-contact scanning. For example, the other measurement technique may be a contact-based measurement technique that is not significantly affected by the reflectivity of component 11. In some embodiments, the other measurement technique may be performed with CMM 26 having contact probe 28. The measurement(s) (e.g., CMM data 30) acquired (e.g., sensed) using the other measurement technique may be considered correct/true measurements of the geometry of component 11 and may then be used as a basis to establish the correction mechanism that will be used to correct scanned data 22.

The correction mechanism may be established for a part type or part family and may define one or more geometric transformations 38 to be applied to scanned data 22 as a function of a quantitative measure of surface quality 25 of the component. The correction mechanism may provide a positional adjustment of scanned data 22 that is based on surface quality 25 to correct positional error(s) in scanned data 22 associated with surface quality 25. In other words, the quantitative value of surface quality 25 may help reduce the error(s) inherent to non-contact (e.g., optical) scanning.

The correction mechanism may be established for a particular component (i.e., for one part number) or for a family of components that are similar because of their geometric shape and size. Components in a family of components may be slightly different but their similarities may be close enough so that the same correction mechanism may be applicable to all of the components of the family. In other words, a component family may be defined as a group of related components that have sufficient sameness and similarities so that the same correction mechanism may be compatible across the component family. For example, parts in the same family may have a similar shape and make use of similar scanning paths/trajectories for non-contact scanner 24 during the acquisition of scanned data 22. In other words, parts in the same family may require substantially the same angles of incidence (e.g., line of sight) between non-contact scanner 24 and the surfaces of component 11 so that substantially the same or similar positional errors may be present in scanned data 22. In various situations, component 11 may be a (e.g., turbine or compressor) blade of a bladed rotor of engine 10 as shown in FIG. 2, a part (e.g., liner) of combustor 16 of engine 10, a stationary vane for installation in a gas path of engine 10, or another component that may require dimensional validation before operation in engine 10.

System 20A may include non-contact scanner 24 operable to acquire digitized scanned data 22 indicative of a geometry of component 11 in a non-contact manner. In some embodiments, scanned data 22 may include a point cloud where each point of the point cloud is intended to indicate a (e.g., 2D, 3D) position on the outer surface of component 11. In other words, non-contact scanner 24 may acquire (e.g., 3D) scanned data 22 indicative of a (e.g., 2D, 3D, curved, flat) geometric feature of component 11. In some embodiments, non-contact scanner 24 may be an optical scanner such as a structured light 3D scanner that uses a projected light pattern and a camera system. In some embodiments, non-contact scanner 24 may be a white light 3D scanner, a blue light 3D scanner or a laser 3D scanner for example. Other types of non-contact scanners having an accuracy that may be affected by surface quality 25 of component 11 may be suitable and part of system 20A.

System 20A may include meter 34 operable to acquire (e.g., sense) data indicative of surface quality 25 of component 11. In some embodiments, meter 34 may be a profilometer and surface quality 25 may be a surface roughness or surface finish. In some embodiments, meter 34 may be a gloss meter. Surface quality 25 may be indicative of a reflectivity of a surface of component 11. In some embodiments, a quantitative value of surface quality 25 may be a reflectivity index expressed in gloss units (GUs). As an example, a gloss meter sold under the trade name "BYK" may be suitable. Surface quality 25 may, for example, be measured as per standard DIN67530 from the standards organization "Deutsches Institute für Normung", and/or as per standard ASTM D523 from the standards organization "ASTM International".

System 20A may include CMM 26 operable to measure the geometry of component 11 using a method that physically contacts (e.g., probes, scans) component 11. For example, CMM 26 may sense discrete points on one or more surfaces of component 11 with mechanical contact probe 28. In some embodiments, CMM data 30 may include fewer data points than scanned data 22.

System 20A may include one or more computers 36 (referred hereinafter in the singular) which may be in data communication with non-contact scanner 24, CMM 26 and also with meter 34. For example, computer 36 may receive scanned data 22 acquired with non-contact scanner 24, surface quality 25 acquired with meter 34, and CMM data 30 acquired with CMM 26. Using the information received, computer 36 may determine one or more geometric transformations 38 that may be applied to scanned data 22 as a correction mechanism. As explained further below, geometric transformation(s) 38 may represent one or more translations and/or one or more rotations that are required to at least partially register the scanned data 22 (e.g., point cloud) with CMM data 30.

System 20A may be used during a benchmarking phase to establish the correction mechanism in the form of geometric transformation(s) 38. For each component or family of components, a plurality of components may be investigated to establish relatively stable and universal (e.g., averaged or otherwise selected to be between upper and lower control limits) geometric transformation(s) 38 for that component family. A plurality of components 11 having different surface qualities 25 may also be investigated to establish geometric transformation(s) 38 applicable to different surface qualities 25. Once established, geometric transformation(s) 38 may be applied to other components of that component family and the applicable geometric transformation(s) 38 may be applied according to surface quality 25.

System 20A may be used during a benchmarking phase and/or subsequently during a component validation (i.e., production) phase. However, once the correction mechanism has been established during the benchmarking phase, CMM 26 and it's slower data acquisition time may no longer be required as shown by the configuration of system 20B in FIG. 5. Accordingly, during the validation phase, the methods described herein may benefit from the data acquisition speed of non-contact scanning while still providing an accuracy that is based on CMM data 30, and reducing or eliminating the need of CMM 26 during the validation phase. In other words, the correction mechanism may fuse non-contact scanning with CMM measuring in a manner that combines favorable attributes of both approaches together. During the validation phase, the use of the correction mechanism described herein may benefit in reducing inspection time for high volume components that traditionally require the use of CMM 26 and have long inspection times.

Figure 3:
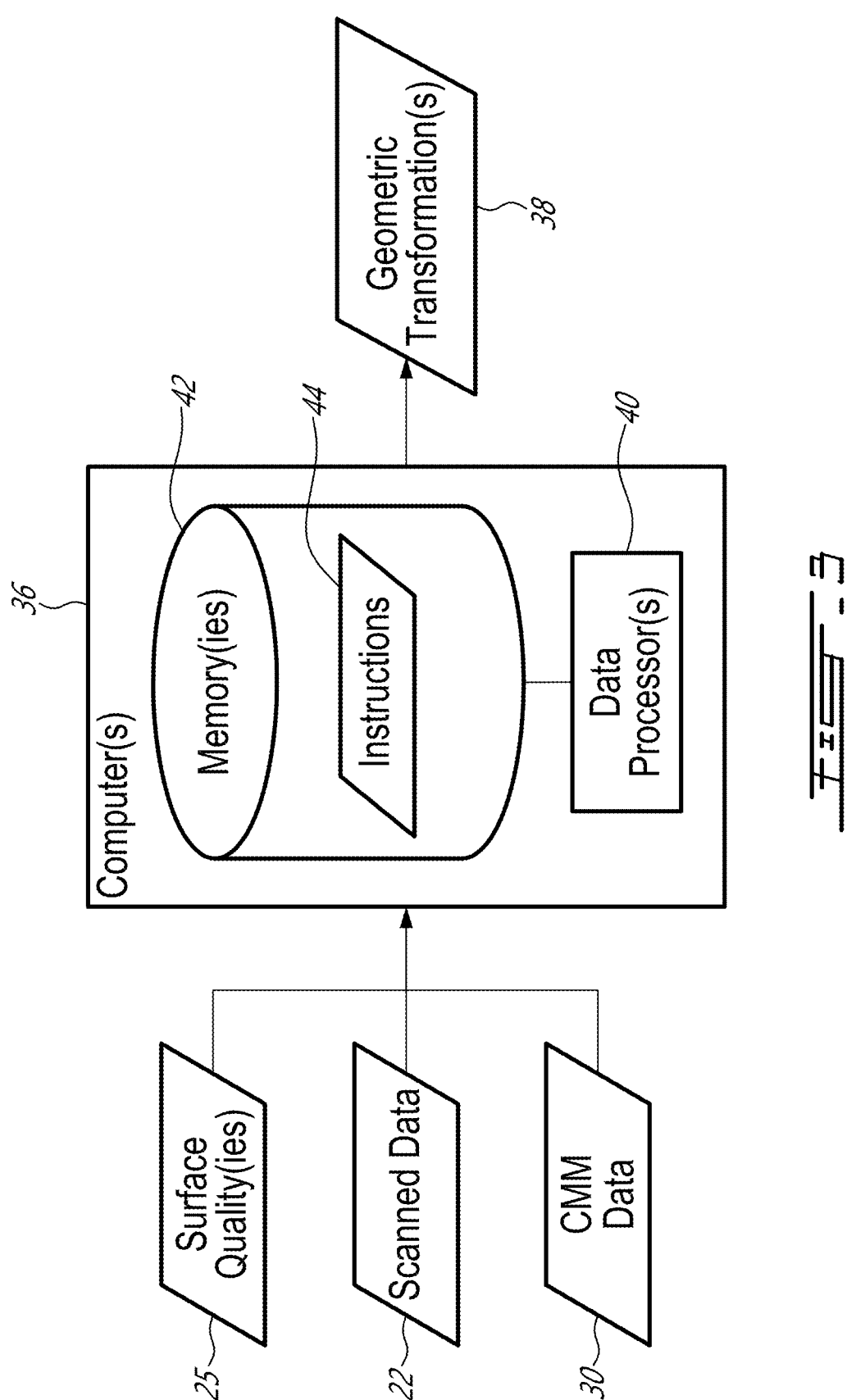
FIG. 3 shows a schematic representation of an exemplary computer of the system of FIG. 2.

FIG. 3 shows a schematic representation of an exemplary computer 36 of system 20A. Computer 36 may include one or more data processors 40 (referred hereinafter in the singular as "processor 40") and non-transitory machine-readable memory (ies) 42 (referred hereinafter in the singular). Computer 36 may be configured to generate geometric transformation(s) 38 based on scanned data 22 and CMM data 30. Computer 36 may be configured to associate geometric transformation(s) 38 with applicable surface qualities 25. Computer 36 may perform one or more procedures or steps defined by instructions 44 (e.g., software, program code) stored in memory 42 and executable by processor 40 to generate geometric transformation(s) 38.

Processor(s) 40 may include any suitable device(s) configured to cause a series of steps to be performed by computer 36 so as to implement a computer-implemented process such that instructions 44, when executed by computer 36 or other programmable apparatus, may cause the functions/acts specified in the methods described herein to be executed. Processor(s) 40 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 42 may include any suitable non-transitory machine-readable storage medium. Memory 42 may include non-transitory controller readable storage medium such as, for example, but not limited to, an electronic, magnetic, optical, electromagnetic, infrared, or semiconductor system, apparatus, or device, or any suitable combination of the foregoing. Memory 42 may include any storage means (e.g., devices) suitable for retrievably storing machine-readable instructions 44 executable by processor(s) 40.

Aspects of the present disclosure may be embodied as systems, devices, methods and/or computer program products for performing one or more actions and/or methods described herein. For example, aspects of the present disclosure may take the form of a computer program product embodied in one or more non-transitory computer readable medium (ia) (e.g., memory 42) having computer readable program code (e.g., instructions 44, geometric transformation(s) 38) embodied thereon. The program code may be readable and executable by one or more computers (e.g., computer(s) 36), processor(s) or logic circuit(s) to perform any one of the methods described herein.

Figure 4:
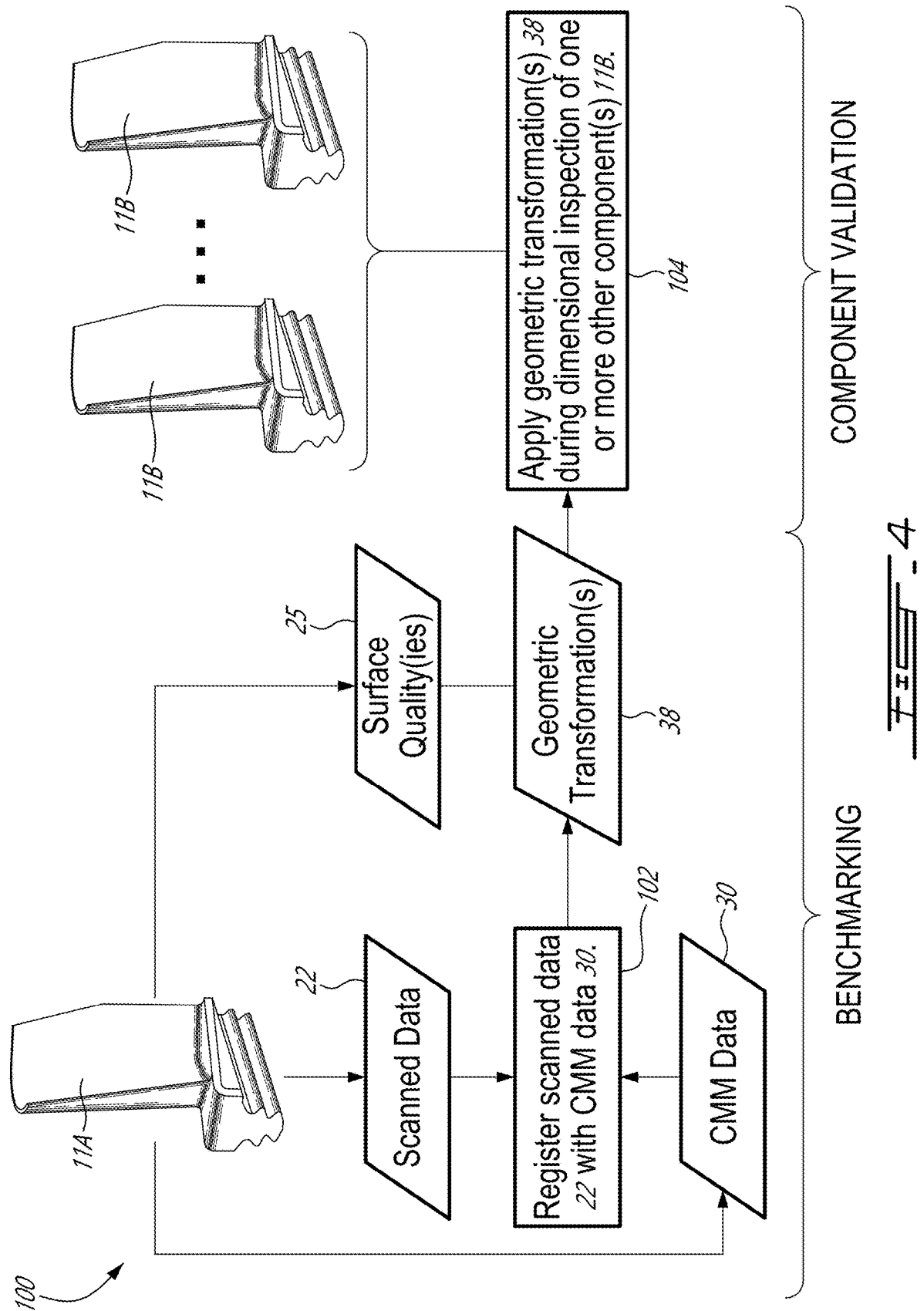
FIG. 4 shows a flow diagram of an exemplary method of performing dimensional inspection of the component.

FIG. 4 shows a flow diagram of an exemplary method 100 of performing dimensional inspection of component 11. Method 100 may be performed using system 20A or another system. Method 100 may include elements of system 20A. Method 100 may include other actions and/or methods disclosed herein. In various embodiments, method 100 may include a benchmarking phase performed on one or more first components 11A as explained above and optionally a component validation phase performed on the same first component 11A and/or on one or more second components 11B. During the benchmarking phase, method 100 may include scanning first component 11A using non-contact (e.g., optical) scanning to acquire scanned data 22 indicative of a geometry of first component 11A. Method 100 may include measuring first component 11A using CMM 26 to acquire CMM data 30 indicative of the geometry of first component 11A. At block 102, method 100 may include registering scanned data 22 with CMM data 30 to determine one or more geometric transformations 38 required to register scanned data 22 with CMM data 30. Method 100 may also include acquiring surface quality 25 of first component 11A and associating geometric transformation(s) with surface quality 25 of first component 11A.

During the component validation phase, method 100 may include block 104 where geometric transformation(s) 38 is/are applied during dimensional inspection of one or more (i.e., other) second components 11B that is/are substantially identical to first component 11A or within the same component family as first component 11A, and have substantially the same surface quality 25 as first component 11A. For example, block 104 may include:

scanning second component 11B using non-contact (i.e., optical) scanning to acquire scanned data 22 indicative of the geometry of second component 11B;

receiving (e.g., acquiring, retrieving) surface quality 25 of second component 11B; and when surface quality 25 of second component 11B corresponds to surface quality 25 of first component 11A, method 100 may include transforming second scanned data 22 using geometric transformation(s) 38 associated with surface quality 25 of first component 11A.

During a relatively high-volume validation phase of second components 11B manufactured consistently using the same process(es), surface quality 25 of these second components 11B may be substantially uniform between components so the surface quality 25 may not necessarily need to be acquired for each second component 11B.

Further aspects of method 100 are described below in reference to the subsequent figures.

Figure 5:
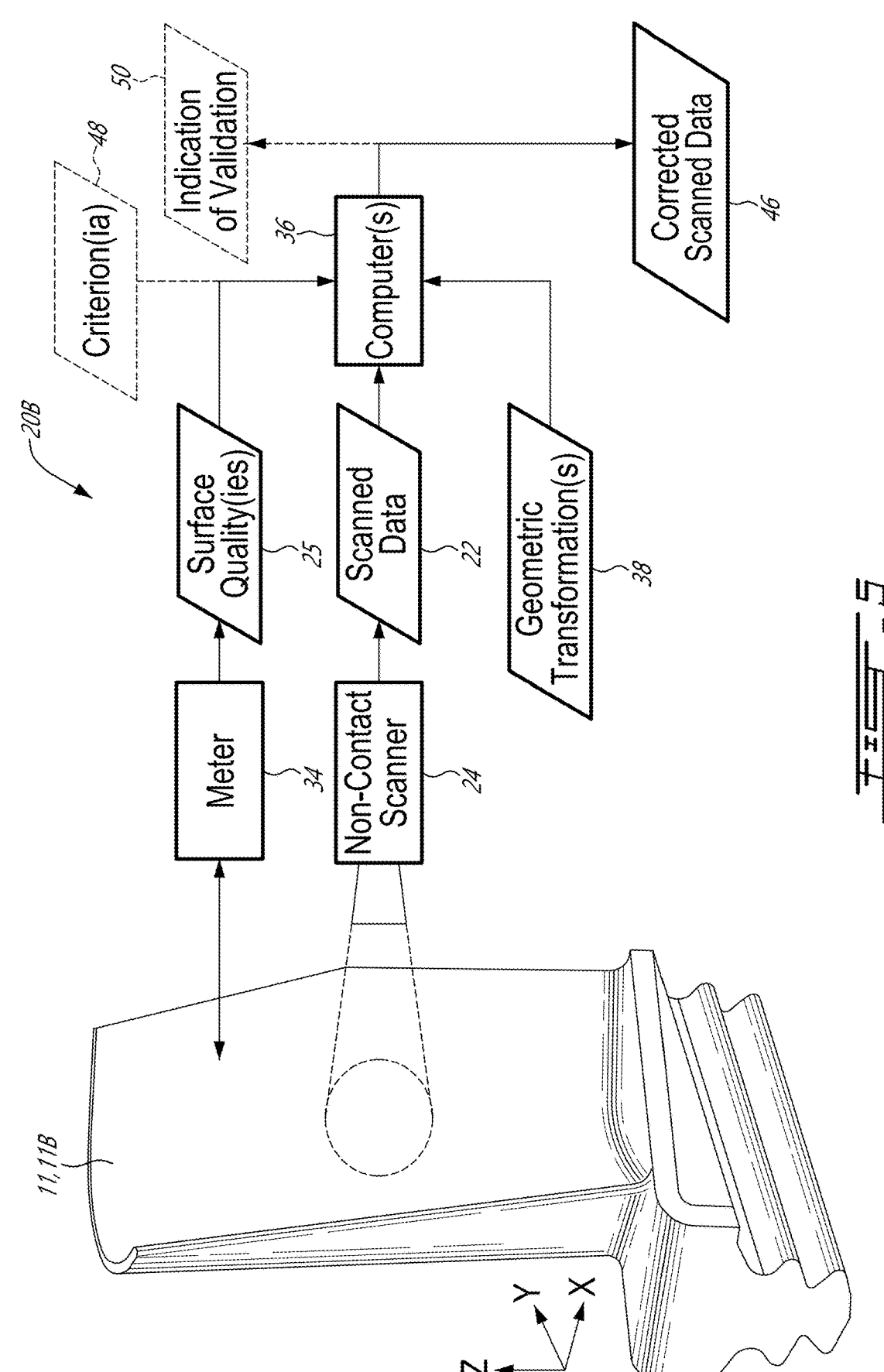
FIG. 5 shows another exemplary component of the engine of FIG. 1 together with a schematic representation of an exemplary system for performing dimensional inspection of the component during a component validation phase.

FIG. 5 shows second component 11B together with a schematic representation of an exemplary system 20B for performing dimensional inspection of second component 11B during the component validation phase. In some embodiments, the same system 20A may optionally perform component validation as well. In some embodiments, system 20B may be different from system 20A. In some embodiments, system 20B may include CMM 26 operable to acquire CMM data 30. In some embodiments, system 20B may not require CMM 26 during the component validation phase. In some embodiments, system 20B may not include (i.e., may be devoid of) CMM 26 operable to acquire CMM data 30. Accordingly, system 20B may not require an amount of footprint to be occupied by CMM 26 on a production shop floor. System 20B may includes elements previously described above in relation to system 20A. Like elements are identified using like reference numerals.

Figure 6:
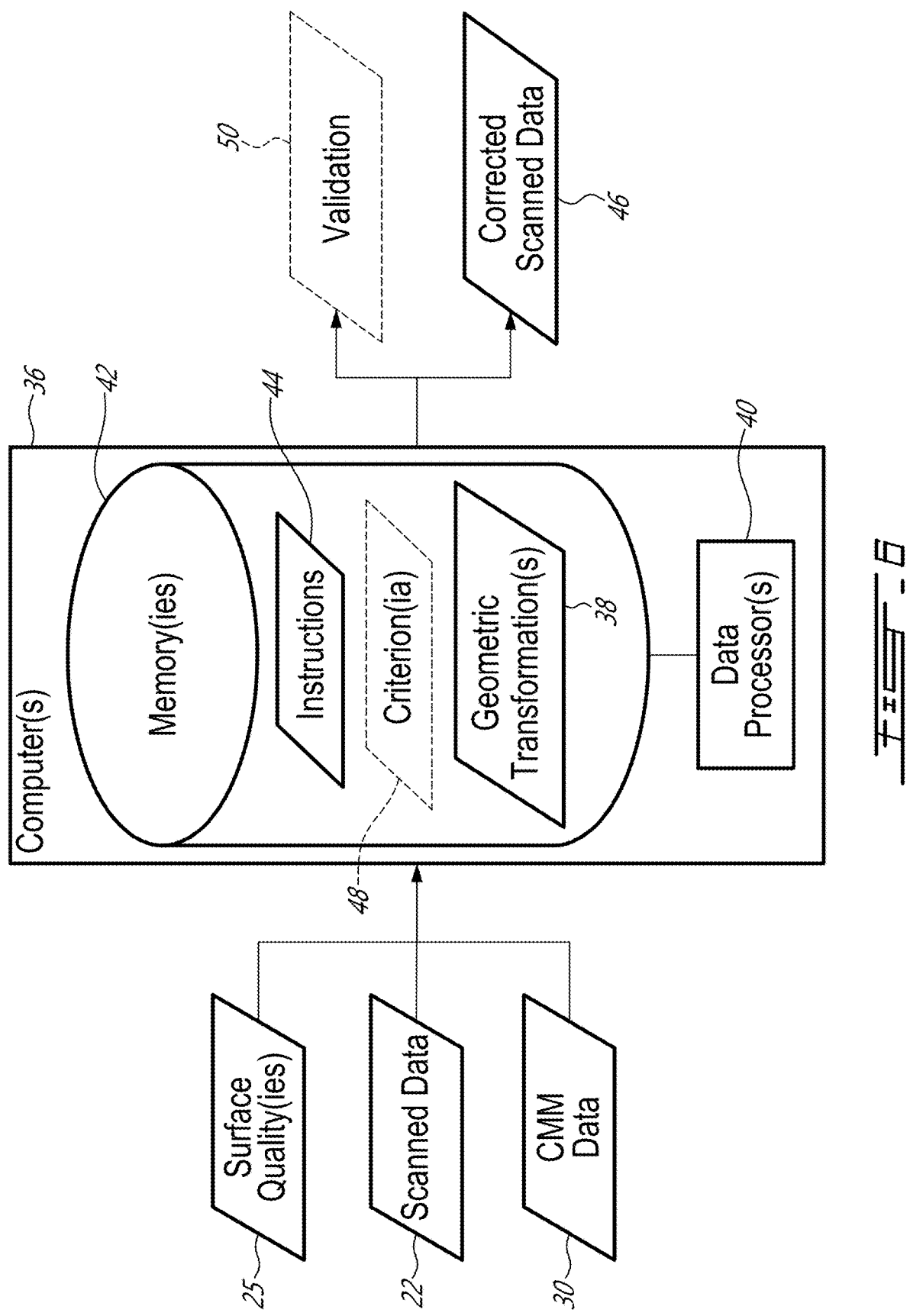
FIG. 6 shows a schematic representation of an exemplary computer of the system of FIG. 4.

FIG. 6 shows a schematic representation of an exemplary computer 36 of system 20B of FIG. 5.

In reference to FIGS. 5 and 6, system 20B may be used to perform dimensional inspection and optionally also a validation of one or more second components 11B. System 20B may include non-contact (e.g., optical) scanner 24 operable to acquire scanned data 22 (e.g., a point cloud) indicative of the geometry of second component 11B in a non-contact manner. System 20B may include meter 34 operable to acquire surface quality 25 of second component 11B. System 20B may include computer(s) 36 having data processor(s) 40 and non-transitory machine-readable memory (ies) 42 operatively connected to data processor(s) and storing: one or more (e.g., a plurality of) geometric transformations 38 respectively associated with different surface qualities 25; and instructions 44 executable by processor(s) 40 and configured to cause processor(s) 40 to:

access selected geometric transformation(s) 38 from the one or more geometric transformations 38 where the selected geometric transformation(s) 38 is associated with surface quality 25 of second component 11B; and transform scanned data 22 using selected geometric transformation(s) 38 associated with surface quality 25 of second component 11B to produce corrected scanned data 46.

The validation phase may include evaluating corrected scanned data 46 against one or more criteria 48 after transforming scanned data 22. When corrected scanned data 46 satisfies criterion 48, an indication of validation 50 may optionally be generated by computer 36. Indication of validation 50 may be a visual or aural indication provided to an operator of system 20B. Alternatively or in addition, indication of validation may be provided as a data entry stored in a suitable electronic inspection/validation log. In some embodiments, indication of validation 50 may be binary (e.g., pass or fail) indication.

When corrected scanned data 46 satisfies criterion 48, second component 11B may be installed in engine 10 if the dimensional inspection was conducted with second component 11B uninstalled from engine 10. Engine 10 may then be operated with second component 11B therein. In some embodiments, criterion 48 may include the point cloud of corrected scanned data 46 complying with a prescribed deviation from a nominal geometry of second component 11B. For example, criterion 48 may include the point cloud of corrected scanned data 46 being within a prescribed dimensional tolerance from the nominal geometry of second component 11B. In some embodiments, evaluating corrected scanned data 46 against one or more criteria 48 may include comparing corrected scanned data 46 against a digitized (e.g., computer aided design) model representing the nominal geometry of second component 11B.

FIGS. 7 and 8 respectively show translations 38T and rotations 38R that may be part of geometric transformation(s) 38. Translations 38T are plotted in FIG. 7 on a graph of translation values (distances) (e.g., dx1, dy1 and dz1) along the X, Y and Z axes (shown in FIGS. 2 and 5) respectively and associated with discrete values of surface quality 25 (e.g., reflectivity index) of a surface of component 11 expressed in GUs. In reference to FIG. 7, translation values along the X, Y and Z axes are represented by the lower, middle and upper lines respectively. For example, translation values dx1, dy1 and/or dz1 may be associated with a reflectivity index of GU1.

Similarly, rotations 38R are plotted in FIG. 8 on a graph of rotation values (angles) (e.g., α1, β1 and/or γ1) about the X, Y and Z axes respectively and associated with discrete values of surface quality 25 of the surface of component 11 expressed in GUs. In reference to FIG. 8, rotation values about the X, Y and Z axes are represented by the lower, middle and upper lines respectively. For example, rotation values α1, β1 and/or γ1 may be associated with the reflectivity index of GU1.

Translations 38T and/or rotations 38R may be determined in reference to a suitable coordinate system common between components 11 in the same family. In various situations, translations 38T may include positive or negative non-zero translation values along one or more of the X, Y and Z axes. In various situations, rotations 38R may include positive or negative non-zero rotation values about one or more of the X, Y and Z axes. As shown in FIGS. 7 and 8, the respective translation values and rotation values may differ based on surface quality 25. Accordingly, a plurality of translations 38T and/or rotations 38R applicable to different respective surface qualities 25 may be may be determined during the benchmarking phase.

Geometric transformation(s) 38 may include one or more translations 38T and/or one or more rotations 38R required to register scanned data 22 with CMM data 30. Registration may include bringing scanned data 22 and CMM data 30 into a common reference system if necessary, and then aligning scanned data 22 with CMM data 30. In some embodiments, registration may be performed using a suitable best fit alignment approach that causes scanned data 22 to match as closely as possible to CMM data 30. In some embodiments, the registration may be a non-rigid registration that identifies a plurality of local geometric transformations 38 applicable to different parts of component 11 and required to align the scanned data 22 with CMM data 30. In some embodiments, one or more geometric transformations 38 may each be a global (i.e., universal) geometric transformation that is (i.e., includes) an average of a plurality of local geometric transformations. Alternatively or in addition, one or more geometric transformations 38 may each be a region-specific local geometric transformation associated with a region of component 11.

In some embodiments, a non-rigid iterative closest point (NR-ICP) algorithm may be used to determine geometric transformation(s) 38 required to correct scanned data 22 based on CMM data 30. In some embodiments, a NR-ICP algorithm as described in the following non-patent document may be suitable: BRIAN AMBERG et al., Optimal Step Nonrigid ICP Algorithms for Surface Registration, Conference Paper in Proceedings, IEEE Computer Society Conference on Computer Vision and Pattern Recognition, June 2007.

FIG. 9 shows an exemplary translation equation 52 for performing a geometric transformation of scanned data 22 (e.g., point cloud) using translation values dx1, dy1 and dz1 associated with reflectivity index GU1 in the graph of FIG. 7. Translation 38T is represented in matrix form which may be applied to (e.g., multiplied with) individual points from scanned data 22 to obtain corrected scanned data 46.

FIG. 10 shows an exemplary rotation equation 54 for performing a geometric transformation of scanned data 22 (e.g., point cloud) using rotation values α1, β1 and/or γ1 associated with reflectivity index GU1 in the graph of FIG. 8. Rotation 38R is represented in matrix form which may be applied to (e.g., multiplied with) individual points from scanned data 22 to obtain corrected scanned data 46.

FIGS. 11A-11C respectively show matrices 38RX, 38RY and 38RZ (referred generally as "rotation 38R" in equation 54) for performing rotation of scanned data 22 about the X, Y and Z axes respectively using rotation equation 54. In various situations, one or more translation(s) and/or one or more rotation(s) may be performed on scanned data 22 to obtain corrected scanned data 46.

FIG. 12 shows an exemplary configuration of a data repository constructed during the benchmarking phase of method 100 to electronically store geometric transformations 38 in memory 42 or elsewhere in data communication with computer 36. In some embodiments, the data repository may the form of a look-up table. In some embodiments, the data repository may include geometric transformations 38 respectively associated with different component families F1, F2 and/or with different surface qualities GU1-GU3. For each record (i.e., row), geometric transformation(s) 38 may include one or more translations 38T1-38T5 and/or one or more rotations 38R1-38R5. Geometric transformation(s) 38 stored in the data repository may be representative of the data plotted in FIGS. 7 and 8.

During the operation of system 20B, after receiving surface quality 25 of second component 11B, the applicable geometric transformation(s) 38 associated with surface quality 25 of second component 11B may be retrieved from the data repository and applied accordingly to generate corrected scanned data 46.

FIG. 13 shows another exemplary component having different regions 56, 58 together with non-contact scanner 24 at different positions for scanning first region 56 and second region 58. In some situations, component 11 may have different regions to be inspected where the different regions involve different scanning conditions that may influence the quality of inspection. For example, regions 56, 58 may have different surface qualities 25, different geometries and/or may be scanned at different angles of incidence (i.e., line of sight) from the respective surfaces. Accordingly, it is possible that different regions 56, 58 of component 11 may require different geometric transformations 38.

Method 100 may include embodiments where scanning first component 11A using non-contact scanning may include scanning first region 56 and second region 58 of first component 11A; measuring first component 11A using CMM 26 may include measuring first region 56 and second region 58 of first component 11A; and first geometric transformation 38T1, 38R1 may be required to register a first portion of scanned data 22 associated with first region 56, with CMM data 30. Method 100 may includes determining second geometric transformation 38T2, 38R2 (optionally different from first geometric transformation 38T1, 38R1) required to register a second portion of scanned data 22 associated with second region 58, with CMM data 30. Second component 11B may have first region 56 and second region 58 respectively corresponding to first region 56 and second region 58 of first component 11A. Transforming scanned data 22 acquired from second component 11B may include: transforming a first portion of scanned data 22 associated with first region 56 of second component 11B using first geometric transformation 38T1, 38R1; and transforming a second portion of scanned data 22 associated with second region 58 of second component 11B using second geometric transformation 38T2, 38R2.

FIG. 14 shows a flow diagram of an exemplary method 200 of validating component 11 using dimensional inspection. Method 200 may be performed using system 20A or system 20B, or another system. Method 200 may include elements of system 20A and/or of system 20B. Method 200 may include other actions and/or methods disclosed herein. Some or all of method 200 may be combined with method 100. In various embodiments, method 200 may include:

using non-contact scanning of second component 11B to acquire scanned data 22 (e.g., point cloud) indicative of a geometry of second component 11B (block 202);

receiving (e.g., acquiring, retrieving) surface quality 25 of second component 11B (block 204);

selecting geometric transformation 38 associated with surface quality 25 of second component 11B from a plurality of geometric transformations 38 respectively associated with different surface qualities 25 (block 206);

transforming scanned data 22 using geometric transformation 38 associated with surface quality 25 of second component 11B (block 208); and after transforming scanned data 22, evaluating scanned data 22 against criterion 48 to validate second component 11B (block 210).

Through the correction mechanism offered by geometric transformation(s) 38 established during the benchmarking phase, dimensional inspection using non-contact scanner 24 and without CMM 26 during the high-volume validation phase can be performed relatively quickly and with an improved accuracy. The selected geometric transformation 38 may be indicative of one or more positional corrections of scanned data 22 needed to register scanned data 22 with CMM data 30. In some embodiments, using a NR-ICP algorithm to implement the registration for example, scanned data 22 may be corrected to a level of accuracy comparable to that achievable with CMM 26. When (i.e., after) second component 11B is validated, second component 11B may be installed in engine 10 and/or engine 10 may be operated with second component 11B therein.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A method of performing a dimensional inspection, the method comprising:

scanning a first component using optical scanning to acquire first scanned data indicative of a geometry of the first component;

measuring the first component using a coordinate measuring machine (CMM) to acquire CMM data indicative of the geometry of the first component;

determining a geometric transformation required to register the first scanned data with the CMM data;

acquiring a surface quality of the first component;

associating the geometric transformation with the surface quality of the first component;

scanning a second component using the optical scanning to acquire second scanned data indicative of a geometry of the second component;

receiving a surface quality of the second component; and when the surface quality of the second component corresponds to the surface quality of the first component, transforming the second scanned data using the geometric transformation associated with the surface quality of the first component.

2. The method as defined in claim 1, wherein the surface quality of the first component includes a reflectivity index of a surface of the first component.

3. The method as defined in claim 1, wherein acquiring the surface quality of the first component includes taking a gloss measurement from a surface of the first component.

4. The method as defined in claim 1, wherein determining the geometric transformation required to register the first scanned data with the CMM data includes using a non-rigid registration to align the first scanned data with the CMM data.

5. The method as defined in claim 1, comprising constructing a data repository including a plurality of geometric transformations associated with different respective surface qualities of a plurality of first components by, for each first component in the plurality of first components:

scanning the first component using optical scanning to acquire the first scanned data indicative of the geometry of the first component;

measuring the first component using the CMM to acquire the CMM data indicative of the geometry of the first component;

determining the geometric transformation required to register the first scanned data with the CMM data;

acquiring the surface quality of the first component;

associating the geometric transformation with the surface quality of the first component; and storing the geometric transformation and the surface quality in the data repository.

6. The method as define in claim 5, comprising, after receiving the surface quality of the second component, retrieving the geometric transformation from the data repository, the geometric transformation being associated with the surface quality of the second component.

7. The method as define in claim 1, wherein:

scanning the first component using optical scanning includes scanning a first region and a second region of the first component;

measuring the first component using the CMM includes measuring the first region and the second region of the first component;

the geometric transformation is a first geometric transformation required to register a first portion of the first scanned data associated with the first region, with the CMM data;

the method includes determining a second geometric transformation required to register a second portion of the first scanned data associated with the second region, with the CMM data;

the second component has a first region and a second region respectively corresponding to the first region and the second region of the first component;

transforming the second scanned data includes:

transforming a first portion of the second scanned data associated with the first region of the second component using the first geometric transformation; and transforming a second portion of the second scanned data associated with the second region of the second component using the second geometric transformation.

8. The method as defined in claim 1, comprising:

after transforming the second scanned data, evaluating the second scanned data against a criterion; and when the second scanned data satisfies the criterion, installing the second component in an aircraft engine and operating the aircraft engine with the second component.

9. The method as defined in claim 1, wherein the geometric transformation includes a translation and a rotation.

10. A method of validating a component of an aircraft engine, the method comprising:

using non-contact scanning of the component to acquire a point cloud indicative of a geometry of the component;

receiving a surface quality of the component;

selecting a geometric transformation associated with the surface quality of the component from a plurality of geometric transformations respectively associated with different surface qualities;

transforming the point cloud using the geometric transformation associated with the surface quality of the component; and after transforming the point cloud, evaluating the point cloud against a criterion to validate the component.

11. The method as defined in claim 10, wherein the criterion includes the point cloud complying with a prescribed allowable deviation from a nominal geometry of the component.

12. The method as defined in claim 10, comprising, when the component is validated, operating the aircraft engine with the component.

13. The method as defined in claim 10, comprising, when the component is validated, installing the component in the aircraft engine.

14. The method as defined in claim 10, wherein the surface quality of the component includes a reflectivity index of a surface of the component.

15. A system for performing dimensional inspection of a component, the system comprising:

a non-contact scanner operable to acquire a point cloud indicative of a geometry of the component in a non-contact manner;

one or more data processors; and non-transitory machine-readable memory operatively connected to the one or more data processors and storing:

a plurality of geometric transformations respectively associated with different surface qualities; and instructions executable by the one or more data processors and configured to cause the one or more data processors to:

access a selected geometric transformation from the plurality of geometric transformations, the selected geometric transformation being associated with a surface quality of the component; and transform the point cloud using the selected geometric transformation associated with the surface quality of the component.

16. The system as defined in claim 15, wherein the instructions are configured to cause the one or more data processors to, after transforming the point cloud, evaluate the point cloud against a criterion.

17. The system as defined in claim 15, wherein:

the non-contact scanner is an optical scanner; and the system includes a gloss meter operable to acquire the surface quality of the component.

18. The system as defined in claim 15, comprising a gloss meter operable to acquire the surface quality of the component.

19. The system as defined in claim 18, comprising a coordinate measuring machine (CMM) operable to acquire CMM data indicative of the geometry of the component.

20. The system as defined in claim 19, wherein the selected geometric transformation is indicative of a registration of the point cloud with the CMM data.

*    *    *    *    *